Figure 1:
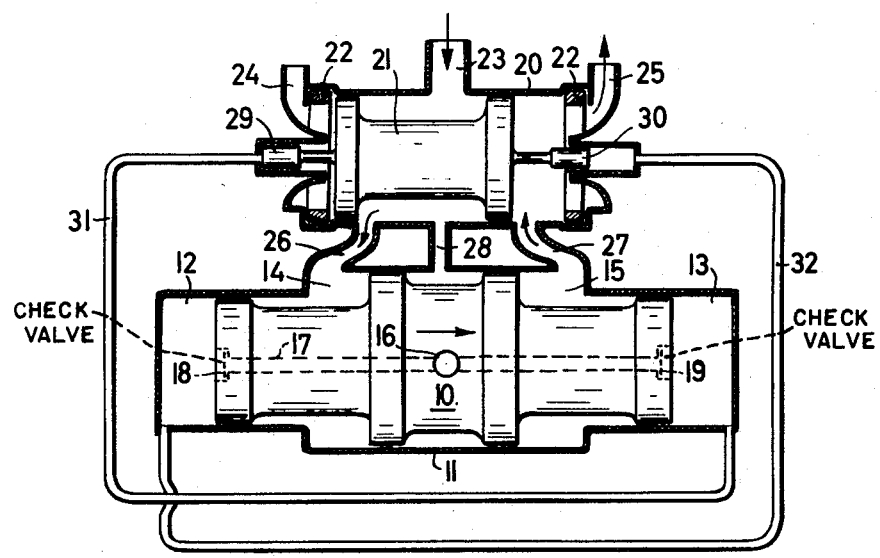

Jan. 6, 1959 — H. HERRMANN — 2,867,191
FREE PISTON VIBRATORS
Filed July 23, 1956 — 2 Sheets-Sheet 1

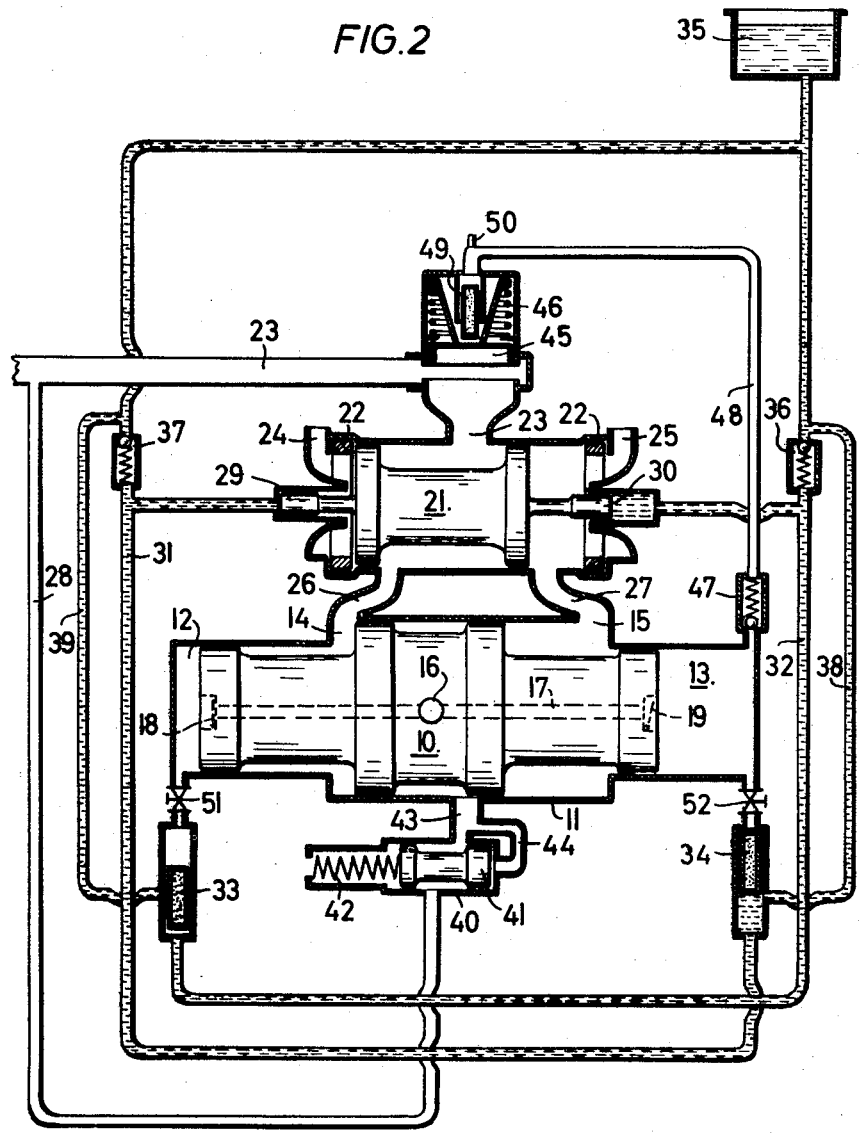

United States Patent Office 2,867,191
Patented Jan. 6, 1959

2,867,191

FREE PISTON VIBRATORS

Helmut Herrmann, Lunen-Altlunen, Germany, assignor to Gewerkschaft Eisenhütte Westfalia, Wethmar, near Lunen, Westphalia, Germany, a German corporation Application July 23, 1956, Serial No. 599,559

Claims priority, application Germany August 1, 1955

19 Claims. (Cl. 121—17)

This invention relates to a free piston vibrator.

The invention more particularly relates to and has as its object a free piston vibrator which may be operated with compressed air, is highly dependable in operation, may be regulated in a simple and convenient manner, and which is particularly suitable for use in the mining industry in connection with mining and coal-loading devices requiring a vibratory drive.

This, and still further objects, will become apparent from the following description, read in conjunction with the drawings, in which:

Fig. 1 is a diagrammatic representation of a simplified embodiment of a free piston vibrator in accordance with the invention, serving the purposes of explanation of operation; and Fig. 2 is a diagrammatic representation of a practical embodiment of a free piston vibrator in accordance with the invention.

The free piston vibrator in accordance with the invention comprises a cylinder having a double-ended piston, freely movable back and forth therein. The cylinder has a cylinder head at each end defining a gas cushion, limiting the travel of the piston in each direction. Suitable conduits are provided for passing compressed gas into the cylinder on one side of the piston for moving the piston in one direction, and on the other side of the piston for moving the piston in the other direction. Means, such as a slide valve, are provided for reversing the flow of the compressed gas, such as compressed air, from one side of the piston to the other, and these means are controlled by pressure variations in the air cushions formed by the cylinder heads.

Referring to the embodiment shown in Fig. 1, the piston 10 of the free piston vibrator freely moves back and forth in the cylinder 11. The piston 10 has a central portion of larger diameter, which moves in sealing engagement with the adjacent walls of the central portion of the cylinder 11. The seal between the piston and the walls may be effected by suitable, machining piston rings, or the like. Each end of the piston 10 is provided with a piston extension of smaller diameter, which extends into the cylinder heads of the cylinder, forming extensions of the cylinder, and the air cushions 12 and 13, which limit the travel of the piston in each direction. The central portion of the piston 10 is constricted and provided with a bore hole 16, which intersects a longitudinal bore hole 17, the ends of which open into the air cushion spaces 12 and 13. The two ends of the bore hole 17 have the check valves 18 and 19, which will allow the flow of gas from the bore hole 17 into the air cushion spaces 12 and 13, which will not allow reverse flow.

Above the cylinder 11 there is positioned a slide valve housing 20, into which there extends a compressed air inlet 23, which has two compressed air outlets 24 and 25. A compressed gas conduit 26 leads from the slide valve housing 20 into communication with the space 14 on one side of the piston 10 and a compressed gas conduit 27 leads from the slide valve housing 20 in communication with the space 15 on the other side of the piston 10. A further conduit 28 leads from the slide valve housing into the constricted portion in the center of the piston 10. A slide valve 21 is movable back and forth in the slide valve housing 20 between a position as shown communicating compressed air inlet 23 with the conduit 26, and a second position at the opposite end of the slide valve housing 20 communicating the compressed air inlet 23 with the conduit 27. The movement of the slide valve is limited by the stops 22 of rubber or similar elastic material, and the movement of the slide valve is effected by means of the control pistons 29 and 30 which are connected to the air cushion spaces 13 and 12, respectively, by means of the conduits 31 and 32, respectively. The conduit 28 is in communication with the compressed air inlet 23 in any position of operation of the slide valve 21.

In operation, compressed air is passed into the compressed air inlet 23, and flows through the conduit 28 and bore holes 16 and 17 into the air cushion spaces 12 and 13. In this connection the corresponding check valves 18 and 19 open. With the slide valve 21 in the position shown, the compressed air passing through the conduit 23 furthermore passes through the conduit 26 into the operating space 14, acting on the piston 10, and forcing the same to the right, so that air is compressed in the air cushion space 13 upon the closing of the check valve 19. At the same time the air cushion space 12 fills up with air under the conduit pressure corresponding to the increase in its volume and the air from the operating space 15 escapes through the conduit 27 and conduit 25 from the slide valve housing to the ambient atmosphere. The increase in pressure in the air cushion space 13 caused by the movement of the piston and compression of the air in this space by means of the piston extension is transmitted through the conduit 31 into the cylinder of the piston 29 and pushes the piston, forcing the slide valve 21 toward the right. In this manner a reversal of the slide valve 21 is effected and the air pressure from the inlet 23 passes through the conduit 27 into the operating space 15, forcing the piston in the reverse direction, while the air from the operating space 14 escapes through the conduit 26 and conduit 24. As the piston moves to the left, it compresses the air in the air cushion space 12 till, at a given point, the pressure in the space transmitted through the conduit 32, acts on the control piston 30, again reversing the slide valve 21 and repeating the procedure. The piston 10 is therefore moved back and forth in rapid sequence, causing a vibratory motion of the entire device. For reliable operation, the conduits 31 and 32 must be maintained very short, since, otherwise, at higher frequencies of operation, the larger volume of air in these conduits will merely be compressed and reliable reversal of the slide valve 21 will not be effected.

In practical operation to overcome this disadvantage and to allow the use of longer conduits, a non-compressible fluid, such as a liquid, is inserted into the conduits in communication with pistons 29 and 30, respectively, and the variations in the air pressures generated in the air cushion spaces 12 and 13 operate on movable members, such as pistons or diaphragms, which are in communication on their other side with the non-compressible fluid.

Such an embodiment is shown in Fig. 2. In this embodiment, the conduits 31 and 32 are filled with liquid, and the pressure in the air cushion spaces 12 and 13 acts on the movable members in the form of the free-floating pistons 33 and 34, movable in a cylinder arrangement. As the air is compressed in the air cushion space 12 upon movement of the piston 10 to the left the floating piston 33 is forced downwardly, acting on the liquid in the conduit 32, which forces the piston 30 to the left, actuating the slide valve 21 in this direction. Conversely, when the piston is moved to the right, the air compressed in the air cushion space 13 acts on the floating piston 34, pushing the same downward, so that the liquid in the column 31 pushes on the piston 29, forcing the slide valve 21 to the right.

In order to equalize any losses of liquid in the conduits 31 and 32, a supply container 35 for the liquid is provided, which is connected by suitable lines and the non-return check valves 36 and 37 to the conduits 32 and 31, respectively. As soon as a reduced pressure prevails in these liquids columns in the conduits 31 or 32, additional liquid flows out of the container 35, maintaining the conduit full.

In order to return, on the other side, an excess of liquid into the container 35, the lines 38 and 39 are provided, which also discharge into the container, and which are controlled by the free-floating pistons 33 and 34, so that these lines are only open when the pistons are in their up position and are sealed off when the pistons move downwardly upon being forced by compressed air in the air cushion space. In this manner the line 38 is only in communication with the line 31 when the pressure in the air cushion space is at its lowest and the line 39 is only in communication with the line 32, when the pressure in the air cushion space 12 is at its lowest.

In this embodiment, instead of a direct feed line 28 for the air cushion spaces 12 and 13 via the bore holes 16 and 17, a branch line 28 is connected with the main compressed air line 23. This branch line leads via a regulating valve 40 to the inlet 43 to the central portion of the cylinder in communication with the bore hole 16. The regulator valve 40 has a piston slide valve 41, which is urged to the right by means of a spring 42. A line 28 leads to the right-hand side of piston 41 and to the inlet 43. The air pressure prevailing in the air cushions 12 and 13 is thus dependent upon the pressure which the spring 42 exerts on the slide valve 41. The higher the pressure in the line 28, the greater the pressure in the line 44, which acts on the piston 41, pushing the same against the spring 42 and cutting down the air flow into the inlet 43. The air pressure in the inlet 43 therefore equalizes itself, dependent upon the tension of the spring 42. In practice, the pressure of the spring 42 is so adjusted that the pressure in the air cushions 12 and 13 is somewhat below the line pressure, and thus can be maintained practically constant.

The adjustment of the desired vibration frequency of the vibrator is effected by regulating the quantity of air flowing from the inlet 23 into the slide valve housing. In the embodiment as shown in Fig. 2, the pressure in the air cushion spaces is used for this regulation. This is effected by having a regulator valve 45 in the inlet from the compressed air line 23 to the housing of the slide valve, which is controlled by the pressure in one of the air cushion spaces. As shown, a conduit 48 connects the air cushion space 13 through a no-return check valve 47 with an actuating piston 49, which acts against the pressure of the space 14, controlling control valve 45 in the inlet from the line 23 to the slide valve housing. The control valve 45 comprises a throttle disc, which tends to cut off the air supply from the inlet 23 under increased pressure in the line 48 and actuation by the piston 49. The line 48 is provided with a small adjustable throttle opening 50 above the piston 49. The adjustable throttle opening 50 allows some of the pressurized gas to escape, so that the piston 49 is constantly under the pressure influence prevailing in the air cushion space 13.

The operation of the device as shown in Fig. 2 is in all other respects identical with that of Fig. 1. If, however, the vibrator does not start when initially passing compressed air through the line 23, due, for example, to the piston 10 being in a dead center position, one of the three-way cocks 51 or 52 is opened, so that communication is interrupted between the piston 33 or 34 and the air cushion space 12 or 13, respectively, and the corresponding operating space of the piston 33 or 34 is connected with the atmosphere. If, for example, the three-way cock 51 is open, pressure in the air cushion space 13 acts on the piston 34. This pressure pushes slide valve 21 via the piston 34, the liquid, and the piston 29 without resistance into a position opposite that shown in the drawing, so that the compressed air can operate the piston, thus starting operation. The cock 51 is then closed, and operation continues in the usual manner.

The free piston vibrator in accordance with the invention is readily adjustable over wide limits of frequency of vibration. Furthermore, it automatically retains the frequency of vibration to which it has been set, even in connection with pressure variations in the line system.

While the invention has been described in detail with reference to the specific embodiments shown, various changes and modifications will become apparent to the skilled artisan, which fall within the spirit of the invention and scope of the appended claims.

I claim:

1. Free piston vibrator comprising a cylinder, a double-ended piston freely movable back and forth in said cylinder, a cylinder head at each end of the cylinder forming an extension of the cylinder, a piston extension on each end of said piston extending into in substantially fluid-tight engagement with the walls of said cylinder heads, said cylinder heads defining gas cushions for said piston extensions limiting the travel of said piston in each direction, means for passing compressed gas into said cylinder on one side of said piston between said piston and piston extension for moving said piston in one direction and on the other side of said piston between said piston and piston extension for moving said piston in the other direction and means controlled by pressure variations in said gas cushions for reversing the flow of compressed gas from one side of said piston to the other.

2. Free piston vibrator according to claim 1, in which said last-mentioned means comprises a slide valve and including a control piston cylinder arrangement for actuating said slide valve in each direction connected for actuation to said gas cushions.

3. Free piston vibrator according to claim 2, in which the cylinders of said control piston cylinder arrangements are connected to said gas cushions by means of fluid conduits and including a movable member sealing each said fluid conduit from said gas cushion, and a liquid filling said conduit between said controlled piston cylinder arrangement and said movable member.

4. Free piston vibrator according to claim 3, including a liquid storage container connected to said fluid conduits, and means controlled by said movable members for opening and closing the connection between said storage container and said fluid conduits.

5. Free piston vibrator according to claim 4, including conduits connecting said storage container to said fluid conduit through no-return check valves.

6. Free piston vibrator according to claim 1, including means for passing compressed gas to said gas cushions at a predetermined pressure.

7. Free piston vibrator according to claim 1, including means for varying pressure of gas passed into said cylinder.

8. Free piston vibrator comprising a cylinder, a double-ended piston freely movable back and forth in said cylinder, said cylinder head at each end of the cylinder forming an extension of the cylinder, a piston extension on each end of said piston extending into in substantially fluid-tight engagement with the walls of said cylinder heads, said cylinder heads defining gas cushions for said piston extensions limiting the travel of said piston in each direction, a slide valve chamber, a compressed gas conduit connected to said slide valve chamber, a first gas conduit connecting said slide valve chamber and said cylinder on the first side of said piston between said piston and piston extension, a second gas conduit connecting said slide valve chamber on the second side of said piston between said piston and piston extension, a slide valve movable in said slide valve chamber between a first position communicating said compressed gas conduit and said first gas conduit, and a second position, communicating said compressed gas conduit and said second gas conduit, a first control piston cylinder arrangement in pressure communication with the cylinder head adjacent said first side of said piston for moving said slide valve to said first position upon pressure actuation, and a second control piston cylinder arrangement in pressure communication with the cylinder head adjacent said side of said piston for moving said slide valve to said second position upon pressure actuation.

9. Free piston vibrator according to claim 8, in which the cylinders of said control piston cylinder arrangements are connected to said cylinder heads by means of fluid conduits and including a movable member sealing each said fluid conduit from said cylinder head and a liquid filling said fluid conduit between said control piston cylinder arrangements and said movable members.

10. Free piston vibrator according to claim 8 including conduit means communicating said compressed gas conduit with said cylinder heads, and check valve means positioned in said conduits for preventing back flow of gas from said cylinder head to said compressed gas conduit.

11. Free piston vibrator according to claim 10, including regulator valve means positioned in said last-mentioned conduit means.

12. Free piston vibrator according to claim 11, in which said conduit means includes a bore extending through said piston and piston extension in communication with said cylinder heads.

13. Free piston vibrator according to claim 12, including a liquid storage container, a first liquid line connecting said storage container to one of said fluid conduits through a no-return check valve, a second liquid line connecting said storage container to the other said fluid conduit through a no-return check valve, a third liquid line connecting one of said fluid conduits in flow communication with said storage container past said no-return check valve, a fourth liquid line connecting other of said fluid conduits in flow communication with said storage container past said no-return check valve, and means actuated by said movable members for interrupting flow communication between said second and third liquid lines and said fluid conduits on movement of said movable members and increased pressure in said cylinder heads.

14. Free piston vibrator according to claim 13, in which said movable members comprise free floating pistions positioned in cylinders and in which said third liquid line is connected to the cylinder of one of said free floating pistons for closure thereof upon movement of said free floating piston on increased pressure in the cylinder head in pressure communication therewith, and in which said fourth liquid line is connected to the cylinder for the other free floating piston in closure actuation thereof upon movement of said free floating piston on increased pressure in the cylinder head in pressure communication therewith.

15. Free piston vibrator according to claim 14, including a control valve positioned in said compressed gas conduit, and means actuated by the pressure in one of said cylinder heads for regulating said control valve.

16. Free piston vibrator according to claim 15, in which said control valve includes a spring-loaded throttle disc, and including a piston cylinder arrangement having a vent opening from the cylinder positioned for closing actuation of said throttle disc by said piston upon increased pressure in said cylinder, and including a gas conduit connecting said cylinder to one of said cylinder heads through a no-return check valve.

17. Free piston vibrator according to claim 16, including a three-way cock positioned between each cylinder head and the cylinder of the free piston connected thereto.

18. Free piston vibrator according to claim 8, including elastic stop means positioned in said slide valve housing limiting the movement of said slide valve therein.

19. Free piston vibrator according to claim 8, including a control valve positioned in said compressed gas conduit, and means actuated by the pressure in one of said cylinder heads for regulating said control valve.

References Cited in the file of this patent

FOREIGN PATENTS 270,095   Germany _____ Feb. 7, 1914